(12) United States Patent
Yoon et al.

(10) Patent No.: US 9,988,732 B2
(45) Date of Patent: Jun. 5, 2018

(54) MANUFACTURING METHOD OF TITANIUM OXIDE ELECTRODE, ACTIVE OXYGEN SPECIES PRODUCTION SYSTEM INCLUDING SAME, CHLORINE PRODUCTION SYSTEM, DYE-SENSITISED SOLAR CELL AND ELECTRIC DOUBLE-LAYER CAPACITOR

(71) Applicant: Seoul National University R&DB Foundation, Seoul (KR)

(72) Inventors: Je-Yong Yoon, Seoul (KR); Choon-Soo Kim, Seoul (KR); Ju-Sol Choi, Gyeonggi-do (KR); Jae-Han Lee, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 266 days.

(21) Appl. No.: 14/785,501

(22) PCT Filed: Jun. 11, 2013

(86) PCT No.: PCT/KR2013/005135
§ 371 (c)(1),
(2) Date: Oct. 19, 2015

(87) PCT Pub. No.: WO2014/175507
PCT Pub. Date: Oct. 30, 2014

(65) Prior Publication Data
US 2016/0168743 A1 Jun. 16, 2016

(30) Foreign Application Priority Data
Apr. 22, 2013 (KR) ........................ 10-2013-0044143

(51) Int. Cl.
*C25D 11/26* (2006.01)
*H01G 9/20* (2006.01)
(Continued)

(52) U.S. Cl.
CPC ................ *C25D 11/26* (2013.01); *C25B 1/00* (2013.01); *C25B 1/02* (2013.01); *C25B 1/26* (2013.01);
(Continued)

(58) Field of Classification Search
CPC ........... C25D 11/20; C25D 11/26; C25B 1/00; C25B 1/02; C25B 1/26; C25B 11/0452; H01G 11/46; H01L 31/04
See application file for complete search history.

(56) References Cited

U.S. PATENT DOCUMENTS

2009/0183994 A1* 7/2009 Misra ...................... C25B 1/003
205/340

FOREIGN PATENT DOCUMENTS

JP 03-236497 10/1991
JP 2006-260991 9/2006
(Continued)

OTHER PUBLICATIONS

International Search Report for International Application No. PCT/KR2013/005135 dated Dec. 20, 2013.

*Primary Examiner* — Bryan D. Ripa
(74) *Attorney, Agent, or Firm* — Greenberg Traurig, LLP; Chinh H. Pham

(57) ABSTRACT

The disclosed manufacturing method of titanium oxide electrode comprises: preparing starting materials for titanium oxide, heat-treating the starting materials of titanium oxide, and electro-reducing the heat-treated starting materials of titanium oxide. According to this method, an anode having excellent active oxygen species production efficiency and excellent electrical properties can be manufactured using inexpensive titanium oxide.

9 Claims, 7 Drawing Sheets

(51) Int. Cl.
- *C25B 1/00* (2006.01)
- *C25B 1/02* (2006.01)
- *C25B 1/26* (2006.01)
- *C25B 11/04* (2006.01)
- *C25F 3/02* (2006.01)
- *H01G 11/46* (2013.01)
- *H01G 11/86* (2013.01)

(52) U.S. Cl.
CPC ............ *C25B 11/0478* (2013.01); *C25F 3/02* (2013.01); *H01G 9/2031* (2013.01); *H01G 11/46* (2013.01); *H01G 11/86* (2013.01); *Y02E 10/542* (2013.01); *Y02E 60/13* (2013.01); *Y02P 70/521* (2015.11)

(56) References Cited

FOREIGN PATENT DOCUMENTS

| | | | |
|---|---|---|---|
| JP | 2007287455 | | 11/2007 |
| JP | 2007287455 A | * | 11/2007 |
| JP | 2009-507752 | | 2/2009 |
| KR | 10-2011-0025237 | | 3/2011 |

* cited by examiner

US 9,988,732 B2

MANUFACTURING METHOD OF TITANIUM OXIDE ELECTRODE, ACTIVE OXYGEN SPECIES PRODUCTION SYSTEM INCLUDING SAME, CHLORINE PRODUCTION SYSTEM, DYE-SENSITISED SOLAR CELL AND ELECTRIC DOUBLE-LAYER CAPACITOR

CROSS-REFERENCE TO RELATED APPLICATIONS

This application is a national phase application under 35 U.S.C. 371 of International Application No. PCT/KR2013/005135, filed Jun. 11, 2013, which claims priority to and the benefit of Korean Application No. 10-2013-0044143, filed Apr. 22, 2013, the disclosures of each of which are incorporated herein by reference in their entireties.

BACKGROUND

1. Field

The present invention relate to a method of manufacturing an electrode. More particularly, the present invention relate to a method of manufacturing a titanium oxide electrode, an active oxygen species production system, a chlorine production system, a dye-sensitive solar cell and an electric double-layer capacitor, which include the titanium oxide electrode.

2. Description of the Related Art

Recently, interest about an electrochemical water-treating process is increasing. Because the electrochemical water-treating process uses unpoisonous reagent, which is electron, unlike a conventional disinfection process using poisonous chemical disinfectant, the electrochemical water-treating process is very environment-friendly. Furthermore, because of not requiring long-distance transportation for the poisonous chemical disinfectant, the electrochemical water-treating process is safe. Furthermore, because of using electric energy, processes can be easily automated. Furthermore, operational costs are small. Electrochemically-produced complex oxidizers, especially, active oxygen species such as hydroxyl radical and ozone have very strong oxidizing power. Thus, interest about an electrode that can produce active oxygen species is increasing in the field of the electrochemical water-treating process.

A boron-doped diamond (BDD) electrode is known for producing hydroxyl radical, and a world-wide market for using the BDD electrode as a water-treating electrode is being made. Even though the BDD electrode has high efficiency and high stability for producing active oxygen species, its mass-manufacturing and practical appliance are difficult because of high manufacturing costs due to a chemical vapor deposition process.

Furthermore, lead oxide (PbO2) electrode is hardly commercialized because of an environmental problem (possibility of lead elution).

Thus, development for an electrode having economic feasibility and having high efficiency for producing active oxygen species is being required.

SUMMARY

The present invention purposes to provide a method of manufacturing a titanium oxide electrode having economic feasibility and having high efficiency for producing active oxygen species.

Furthermore, the present invention purposes to provide an active oxygen species production system including the titanium oxide electrode.

Furthermore, the present invention purposes to provide a chlorine production system including the titanium oxide electrode.

Furthermore, the present invention purposes to provide a dye-sensitized solar cell including the titanium oxide electrode.

Furthermore, the present invention purposes to provide an electric double-layer capacitor including the titanium oxide electrode.

According to a method for manufacturing a titanium oxide electrode according to an exemplary embodiment of the present invention, a titanium oxide base material is prepared. The titanium oxide base material is annealed. The annealed titanium oxide base material is electrically reduced.

In an embodiment, in order to prepare the titanium oxide base material, titanium is anodized to form a titanium oxide layer. A nano-tube array is formed from the titanium oxide layer.

In an embodiment, in order to form the nano-tube array from the titanium oxide layer, electrolysis is performed in an electrolyte solution including a fluorine compound.

In an embodiment, in order to electrically reduce the titanium oxide base material, electrolysis is performed with the titanium oxide base material being used as a cathode in an electrolyte solution.

In an embodiment, the electrolyte solution includes at least one selected from the group consisting of LiCl and $KH_2PO_4$. An anode used in the electrolysis includes platinum, iron, nickel or carbon.

An active oxygen species production system according to an exemplary embodiment of the present invention includes a container, an electrolyte solution disposed in the container, a cathode dipped in the electrolyte solution and a titanium oxide anode dipped in the electrolyte solution. The titanium oxide electrode is manufactured by annealing a titanium oxide base material and electrically reducing the annealed titanium oxide base material.

In an embodiment, the active oxygen species production system further includes a separator disposed between the anode and the cathode.

A dye-sensitive solar cell according to an exemplary embodiment of the present invention includes a titanium oxide electrode manufactured by annealing a titanium oxide base material and electrically reducing the annealed titanium oxide base material.

An electric double-layer capacitor according to an exemplary embodiment of the present invention includes a titanium oxide electrode manufactured by annealing a titanium oxide base material and electrically reducing the annealed titanium oxide base material.

A chlorine production system according to an exemplary embodiment of the present invention includes a container, an electrolyte solution disposed in the container and including chlorine, a cathode dipped in the electrolyte solution and a titanium oxide anode dipped in the electrolyte solution. The titanium oxide electrode is manufactured by annealing a titanium oxide base material and electrically reducing the annealed titanium oxide base material.

According to the present invention, a titanium oxide electrode having excellent active oxygen species production efficiency and electrical properties, and an active oxygen species production system, a chlorine production system, a dye-sensitive solar cell and an electric double-layer capacitor, which use the titanium oxide electrode, may be provided.

DESCRIPTION OF EMBODIMENTS

Various exemplary embodiments will be described more fully, in which some exemplary embodiments are shown. The present inventive concept may, however, be embodied in many different forms and should not be construed as limited to the exemplary embodiments set forth herein. Rather, these exemplary embodiments are provided so that this description will be thorough and complete, and will fully convey the scope of the present inventive concept to those skilled in the art. Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. The terminology used herein is for the purpose of describing particular exemplary embodiments only and is not intended to be limiting of the present inventive concept. As used herein, the singular forms "a," "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Method for Manufacturing a Titanium Oxide Electrode

Figure 1:
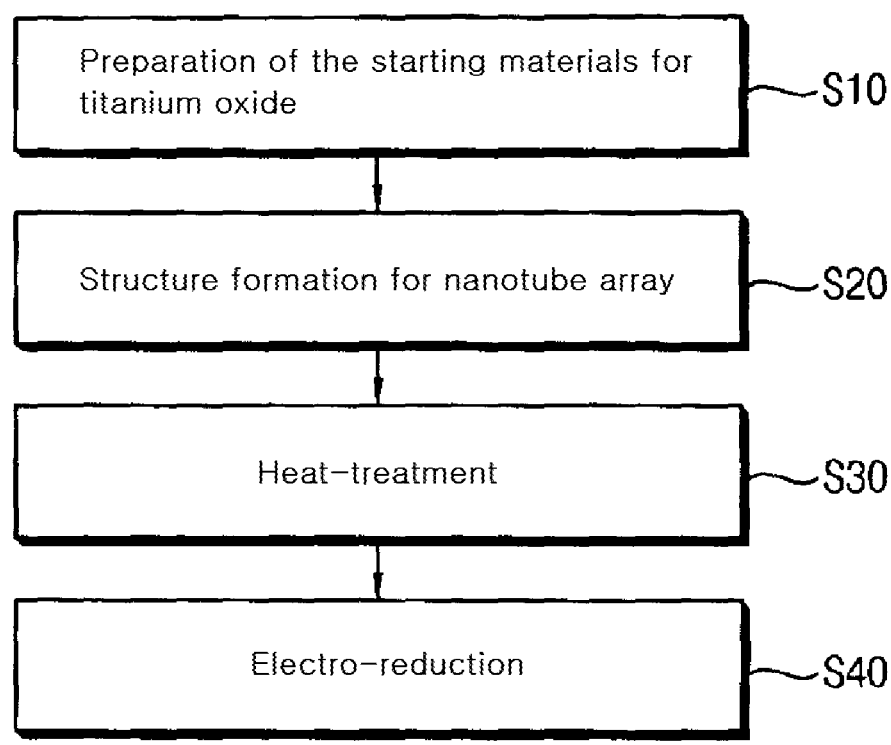
FIG. 1 is a flow chart illustrating a method for manufacturing a titanium oxide electrode according to an exemplary embodiment of the present invention.

FIG. 1 is a flow chart illustrating a method for manufacturing a titanium oxide electrode according to an exemplary embodiment of the present invention.

Referring to FIG. 1, firstly, a titanium oxide ($TiO_2$) base material is prepared. The titanium oxide base material may have a nano-tube array structure of titanium oxide. The nano-tube array structure of titanium oxide may be obtained by electrochemically treating a surface of titanium oxide.

Particularly, titanium oxide base material having a titanium oxide surface layer is prepared (S10). The titanium oxide base material may be obtained through a anodizing method or the like.

Thereafter, a nano-tube array structure is formed at a surface of the titanium oxide base material (S20). In order to form the nano-tube array structure, electrolysis is performed with using the titanium oxide base material as an anode in a solution including an electrolyte, a fluorine compound and water.

Examples of the electrolyte may include acetonitrile, ethylene glycol, butanol, isobutyl alcohol, isopentyl alcohol, isopropyl alcohol, ethyl ether, dioxane, tetrahydrofuran, n-butyl ether, propyl ether, isopropyl ether, acetone, methylethyl ketone, methylbutyl ketone, isobutyl ketone, ethylene carbonate (EC), diethyl carbonate (DEC), propylene carbonate (PC), dimethyl carbonate (DMC), ethylmethyl carbonate (EMC), gamma-butyrolactone (GBL), N-methyl-2-pyrollidone, 3-methoxypropionitrile (MPN) or the like. These may be used each alone or in a combination thereof.

Examples of the fluorine compound may include hydrofluoric acid (HF), ammonium fluoride ($NH_4F$) or the like. These may be used each alone or in a combination thereof.

Furthermore, the solution for the electrolysis may further include sulfuric acid, nitric acid, chromic acid, acetic acid, phosphoric acid or any combination thereof.

Examples of a cathode for the electrolysis may include a platinum electrode.

In the process of the electrolysis, the titanium oxide layer is etched by fluorine ions or the like to form an array having a tube shape. The tube-shaped array increases a contact surface with an electrolyte solution and pore-production thereby increasing properties for producing active oxygen species and electrical properties.

According to an exemplary embodiment, a titanium oxide nano-tube array having a fine and uniform structure may be formed by using an electrolyte solution including a fluorine compound.

Thereafter, the titanium oxide base material having the nano-tube array structure is annealed (heat-treated) (S30). The titanium oxide base material may be annealed at about 300° C. to about 500° C. Accordingly, the titanium oxide nano-tube array is sintered to have a crystalline structure.

Thereafter, the annealed titanium oxide base material is electrically reduced (S40). For the electrical reduction, the titanium oxide base material is connected to a cathode, and then connected to an anode including platinum, iron, nickel, carbon or the like, and electric current is provided thereto in an electrolyte solution.

The electrolyte solution may include LiCl, $KH_2PO_4$ or the like. These may be used each alone or in a combination thereof. The electrolyte solution may further include an alkali such as sodium hydroxide.

A titanium oxide electrode obtained through the above-described method may have high efficiency for producing active oxygen species. Thus, the titanium oxide electrode may be used for an active oxygen species production device, a dye-sensitive solar cell or the like. Especially, the titanium oxide electrode may be used instead of a BDD electrode to make an active oxygen species production device that is economical as well as efficient.

Furthermore, the titanium oxide electrode may have high efficiency for producing chlorine.

Furthermore, because of having high charging current, the titanium oxide electrode may be used instead of a carbon electrode of an electric double-layer capacitor or for an electrode of dye-sensitive solar cell.

Active Oxygen Species Production System

Figure 2:
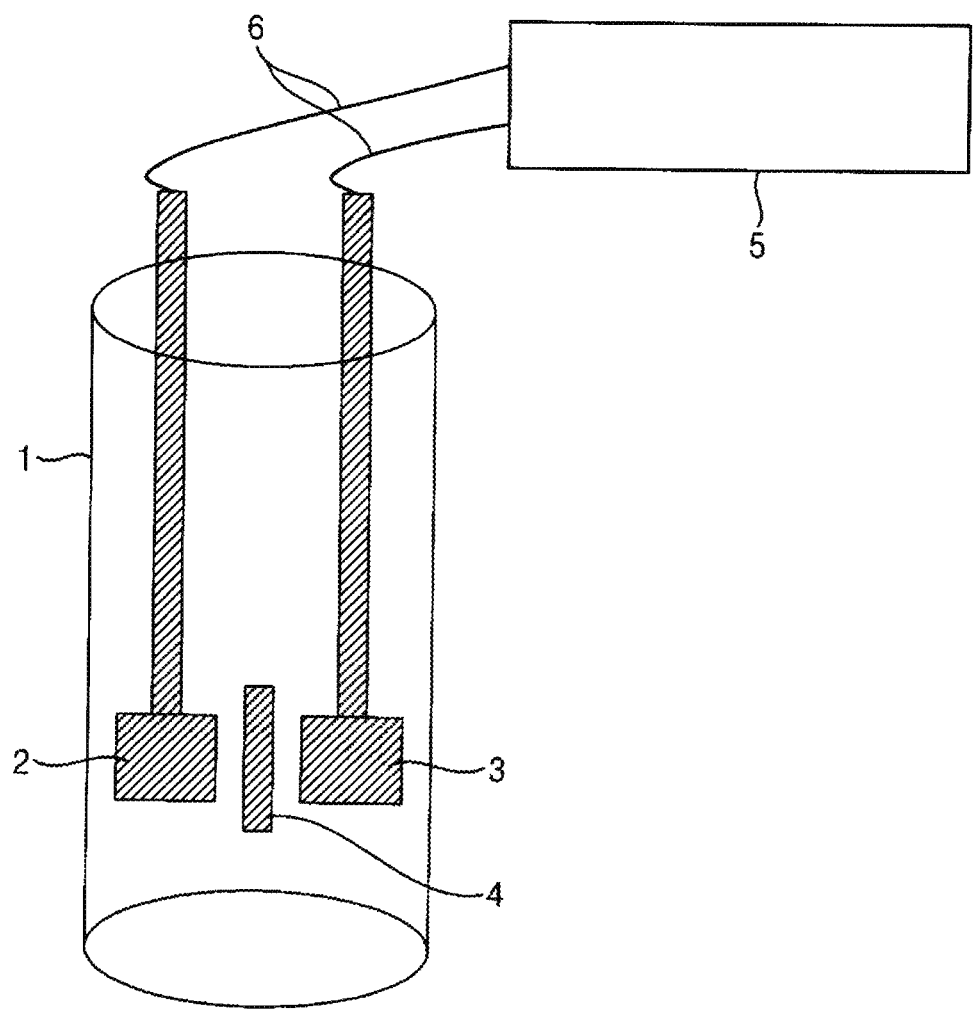
FIG. 2 is a schematic view illustrating an active oxygen species production system according to an exemplary embodiment of the present invention.

FIG. 2 is a schematic view illustrating an active oxygen species production system according to an exemplary embodiment of the present invention.

Referring to FIG. 2, an active oxygen species production system includes a titanium oxide anode 2 and a platinum cathode 3, which are disposed in a container 1. The platinum cathode 3 may be replaced with any electrode that can function as a cathode. The titanium oxide anode 2 is formed through the previously described method for manufacturing a titanium oxide electrode.

The container 1 is filled with an electrolyte solution. The titanium oxide anode 2 and the platinum cathode 3 are dipped in the electrolyte solution. The titanium oxide anode 2 and the platinum cathode 3 are electrically connected to a power supplier 5 through a connection wiring 6.

When an electrical power is applied to the titanium oxide anode 2 and the platinum cathode 3, active oxygen species such as ozone is generated. In order separate gas, such as ozone, hydrogen, oxygen or the like, generated in the process of producing active oxygen species, a separator such as Nafion may be disposed between the titanium oxide anode 2 and the platinum cathode 3.

Furthermore, in order to increase efficiency for producing active oxygen species, a plurality of electrodes (anodes and cathodes) may be alternately arranged, or the titanium oxide anode 2 and the platinum cathode 3 may have a convexo-concave structure.

Chlorine Production System

A chlorine production system according to an exemplary embodiment of the present invention has a substantially same configuration as the active oxygen species production system except for using an electrolyte including a chlorine-containing compound such as sodium chloride or the like.

Dye-Sensitive Solar Cell

Figure 3:
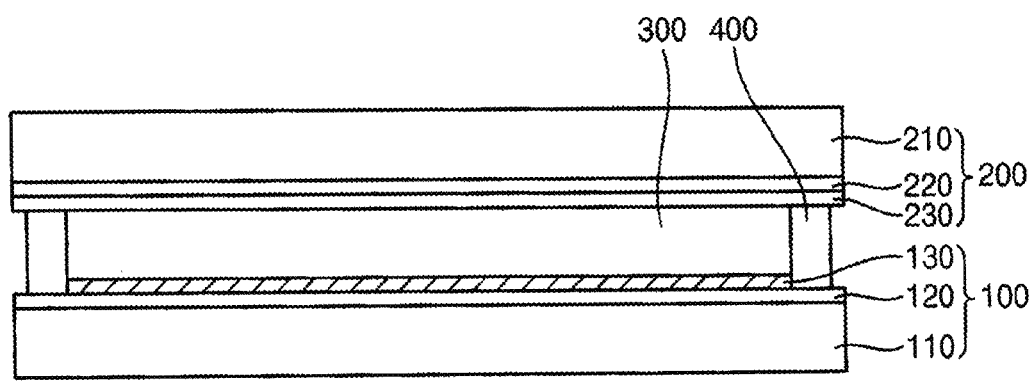
FIG. 3 is a cross-sectional view illustrating a dye-sensitive solar cell including a titanium oxide electrode manufactured according to an exemplary embodiment of the present invention.

FIG. 3 is a cross-sectional view illustrating a dye-sensitive solar cell including a titanium oxide electrode manufactured according to an exemplary embodiment of the present invention.

Referring to FIG. 3, a dye-sensitive solar cell includes a first substrate 100, a second substrate 200 facing the first substrate 100, and an electrolyte solution 300 interposed between the first substrate 100 and the second substrate 200. The first substrate 100 and the second substrate 200 are combined with each other by a sealing member 400.

The first substrate 100 includes a first base substrate 110, a first conductive layer 120 and a titanium oxide electrode 130 onto which a dye is adsorbed. The second substrate 200 includes a second base substrate 210, a second conductive layer 220 and a platinum layer 230. The first base substrate 110 and the second base substrate 210 may include a transparent insulation material, for example, glass.

When a dye molecule adsorbed onto the titanium oxide electrode 130 absorbs a solar light, the dye molecule is electronic-transited from a ground state to an excited state to generate electron-hole pair. An electron on an excited state is injected into a conduction band of an interface of a titanium oxide particle, and transferred to the first conductive layer 120. An oxidized dye as a result of electronic transition is reduced by an iodine ion in the electrolyte solution. An oxidized trivalent iodine ion is combined with an electron of an interface of the platinum layer 230 for reduction reaction to achieve charge neutrality.

The titanium oxide electrode 130 is manufactured by the previously described method of manufacturing a titanium oxide electrode.

Electric Double-Layer Capacitor

Figure 4:
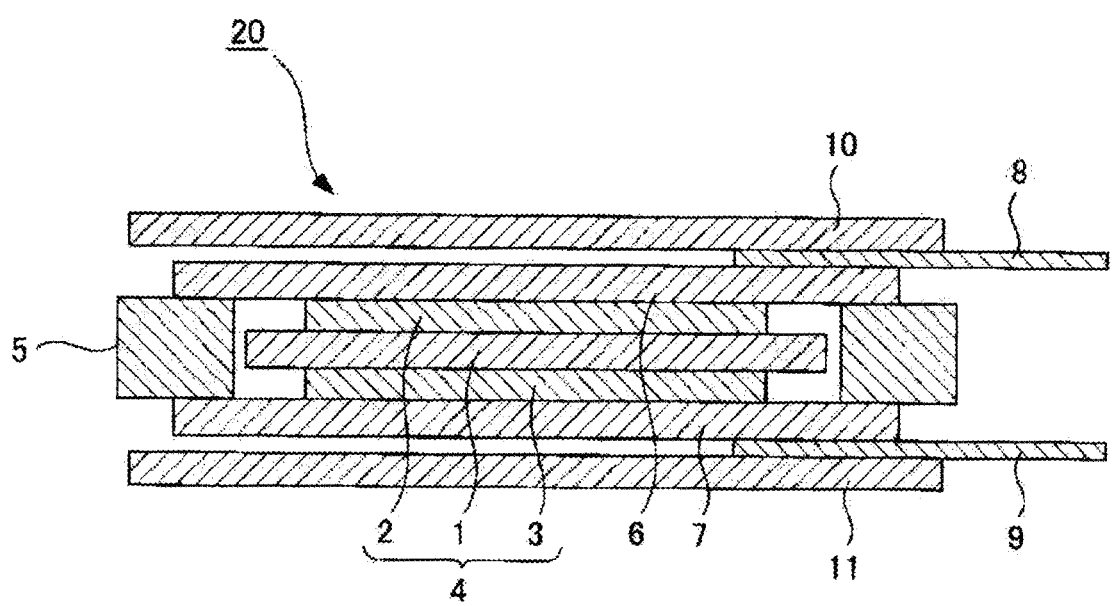
FIG. 4 is a cross-sectional view illustrating an electric double-layer capacitor including a titanium oxide electrode manufactured according to an exemplary embodiment of the present invention.

FIG. 4 is a cross-sectional view illustrating an electric double-layer capacitor including a titanium oxide electrode manufactured according to an exemplary embodiment of the present invention.

Referring to FIG. 4, an electric double-layer capacitor includes a unit cell 4 including a separator 1 and two electrodes 2 and 3 respectively adjacent to an upper surface and a lower surface of the separator. A titanium oxide electrode is used for the two electrodes 2 and 3 in the embodiment. Particularly, the titanium oxide electrode is manufactured by the previously described method of manufacturing a titanium oxide electrode. A packing 5 having a gasket shape is disposed outside the cell 4. The packing 5 prevents leakage of an organic electrolyte solution from the cell 4, and provides electrical insulation between the cells 4 adjacent to each other. Aluminum collecting films 6 and 7 are respectively disposed on an outer surface of the electrodes 2 and 3, which is opposite to a surface adjacent to the separator 1). Collecting terminals 8 and 9 are respectively disposed on an outer surface of the collecting films 6 and 7. Furthermore, end plates 10 and 11 are respectively disposed on an outer surface of the collecting terminals 8 and 9, and strongly fixed by a fixing member (not shown).

Hereinafter, a method of manufacturing a titanium oxide electrode according to the present invention and effects thereof will be explained with reference particular examples and experiments.

Example 1—Manufacturing a Titanium Oxide Electrode

A titanium oxide base material having a titanium oxide layer at a surface thereof was prepared by anodizing a titanium sample. The titanium oxide base material was dipped in an electrolyte solution including ethylene glycol, $NH_4F$ and water, and electrolysis was performed with using the titanium oxide base material as an anode and using a platinum electrode as a cathode. Weight ratio of ethylene glycol, $NH_4F$ and water in the electrolyte solution was about 97.3:2.5:0.2. The electrolysis was performed for about 16 hours.

After the electrolysis, the titanium oxide base material was annealed at about 450° C. for about 1 hour.

After annealed, the titanium oxide base material was electrically reduced with using the titanium oxide base material as a cathode and using a platinum electrode as an anode. Particularly, a current of about 0.1 A was applied in an electrolyte including about 0.1M of $KH_2PO_4$ (further including NaOH, wherein pH is about 7.2) for about 1 minute and 30 seconds.

Figure 5A:
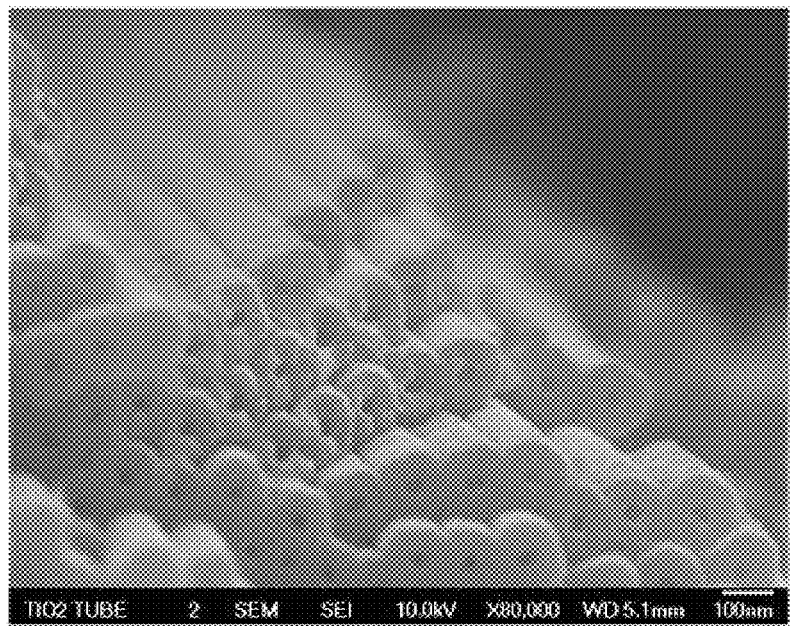
FIGS. 5a and 5b are SEM pictures of a titanium oxide electrode obtained by electrical reduction.
Figure 5B:
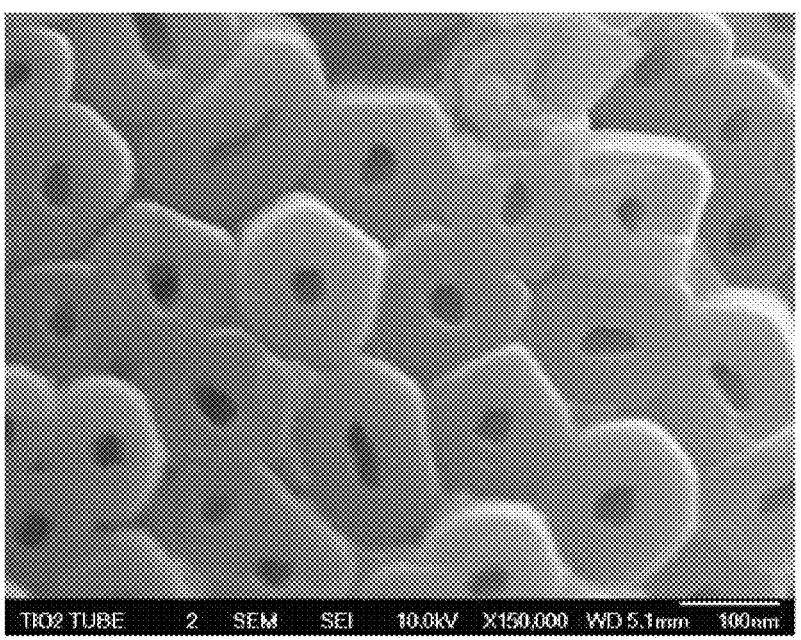

FIGS. 5a and 5b are SEM pictures of a titanium oxide electrode obtained by electrical reduction. Referring to FIGS. 5a and 5b, it can be noted that a nano-tube array was well formed. In the titanium oxide electrode, a pore size was measured to be about 20 nm.

Experiment 1—Evaluating Oxidization Electrode Properties of Titanium Oxide Electrode Cyclic voltammetry with about 100 mV/s of a scanning speed was applied with using the titanium oxide electrode of Example 1 as a working electrode and using a platinum electrode as an opposite electrode and using an Ag/AgCl electrode as a reference electrode in an electrolyte including about 0.1M of $KH_2PO_4$ (further including NaOH, wherein pH is about 7.2). Furthermore, for Comparative Example 1, a titanium oxide electrode was prepared by a same method (forming nano-tube array and annealing) as Example 1 except for electrical reduction, and are used for a working electrode with a same cyclic voltammetry as Example 1. For Comparative Example 2, a BDD electrode was used for a working electrode with a same cyclic voltammetry as Example 1. Obtained results for the above are illustrated in FIG. 6

Figure 6:
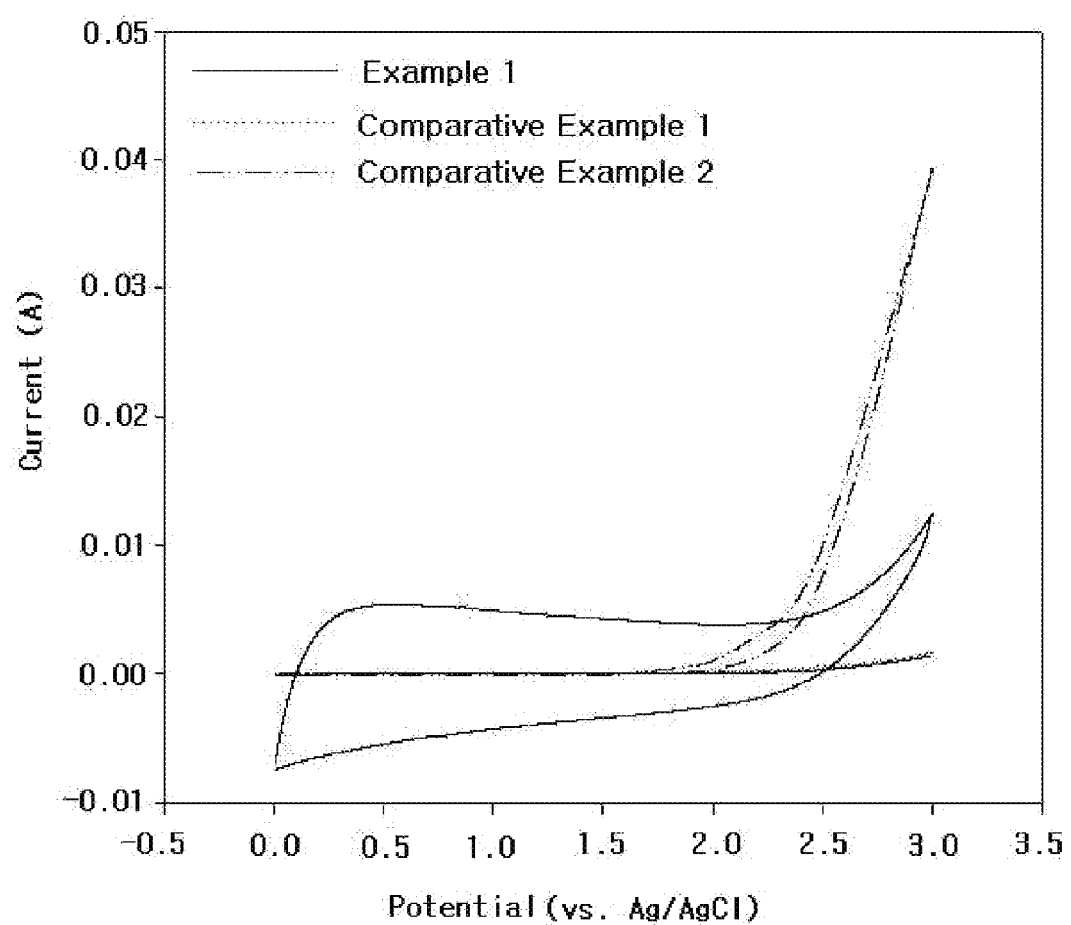
FIG. 6 is a graph illustrating current-voltage properties of the titanium oxide electrode according to Example 1 and the electrodes according to Comparative Examples 1 and 2.

Referring to FIG. 6, the titanium oxide electrode of Example 1 has similar current-voltage properties to the BDD electrode. Thus, it can be noted that the titanium oxide electrode may have advantages for an oxidization electrode. Furthermore, the titanium oxide electrode of Example 1 has different current-voltage properties from the titanium oxide electrode of Comparative Example 1, particularly, greater charging/discharging current. Thus, it can be noted that the titanium oxide electrode may be used for an electric double-layer capacitor.

Figure 7:
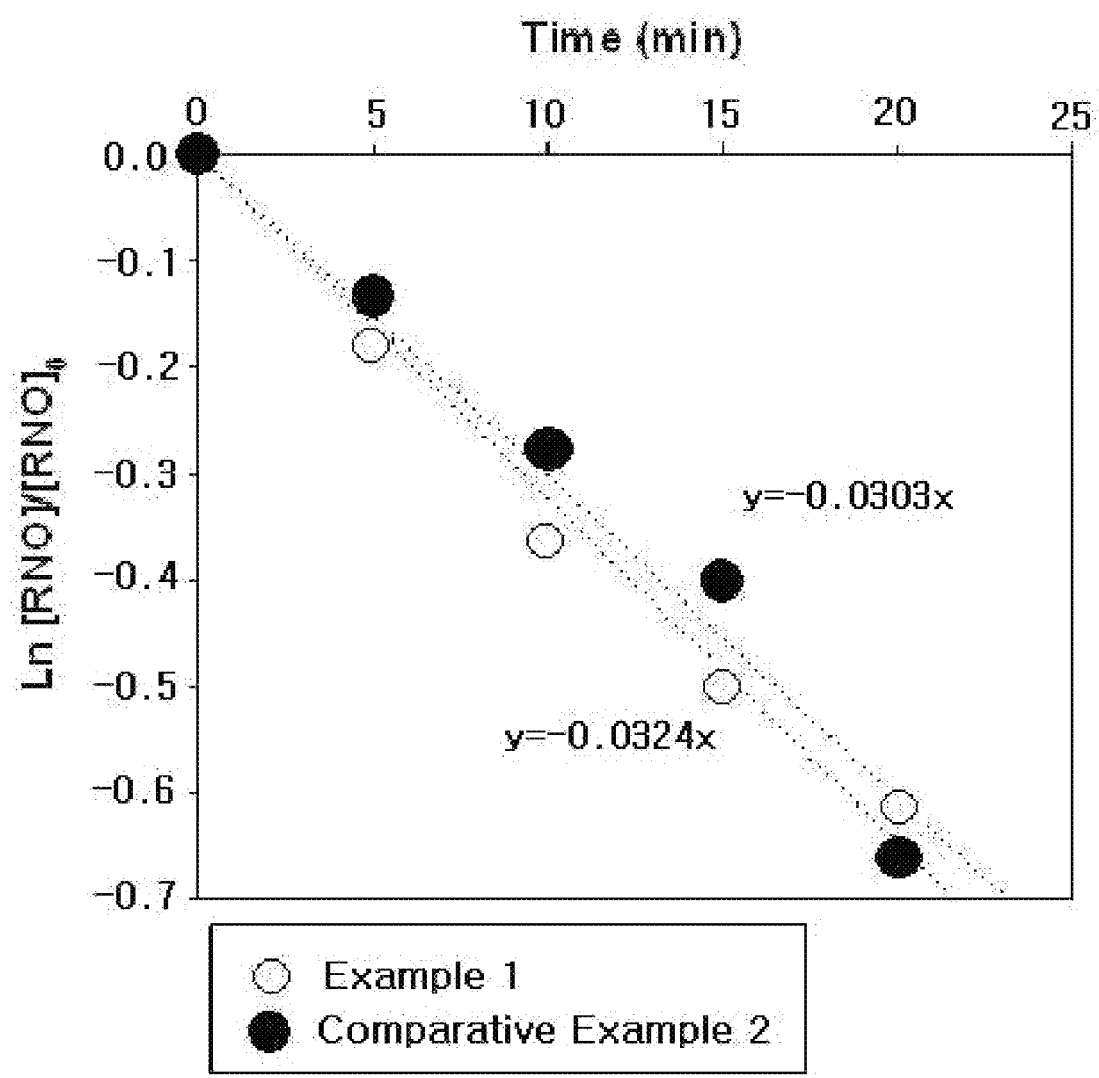
FIG. 7 is a graph illustrating active oxygen species production properties of the titanium oxide electrode according to Example 1 and the electrode according to Comparative Example 2.

Experiment 2—Evaluating Active Oxygen Species Production Properties of Titanium Oxide Electrode In order to perform electrolysis, about 0.3 A of current was applied with using the titanium oxide electrode of Example 1 as an anode and using a platinum electrode as a cathode an in an electrolyte including about 0.1M of $KH_2PO_4$ (further including NaOH, wherein pH is about 7.2). p-nitrosodimethylaniline was used for a probe material of hydroxyl radical, and absorbance of the probe material was analyzed at about 440 nm by a spectrophotometer. Furthermore, electrolysis for a comparative example was performed according to a same method as the above except for using the BDD electrode of Comparative Example 2 as an anode. Absorbance of the probe material was analyzed at about 440 nm by a spectrophotometer. Obtained results are illustrated in FIG. 7. FIG. 7 is record of concentration of the probe material, which reduces with respect to a time lapse. [RNO] is a mole number of the probe material. [RNO]0, which is a initial value, is about 20 uM.

Referring to FIG. 7, the titanium oxide electrode of Example 1 has similar active oxygen species production properties to the BDD electrode. Thus, it can be noted that the titanium oxide electrode may be used for an oxidization electrode instead of the BDD electrode.

Experiment 3—Evaluating Chlorine Production Properties of Titanium Oxide Electrode In order to perform electrolysis, about 0.1 A of current was applied with using the titanium oxide electrode of Example 1 as an anode and using a platinum electrode as a cathode an in an electrolyte including about 0.1M of NaCl. In order to perform electrolysis for a comparative example, about 0.1 A of current was applied with using an $IrO_2/TiO_2$ insoluble electrode as an anode and using a platinum electrode as a cathode an in an electrolyte including about 0.1M of NaCl. An amount of chlorine produced in the experiment was measured and illustrated in FIG. 8.

Figure 8:
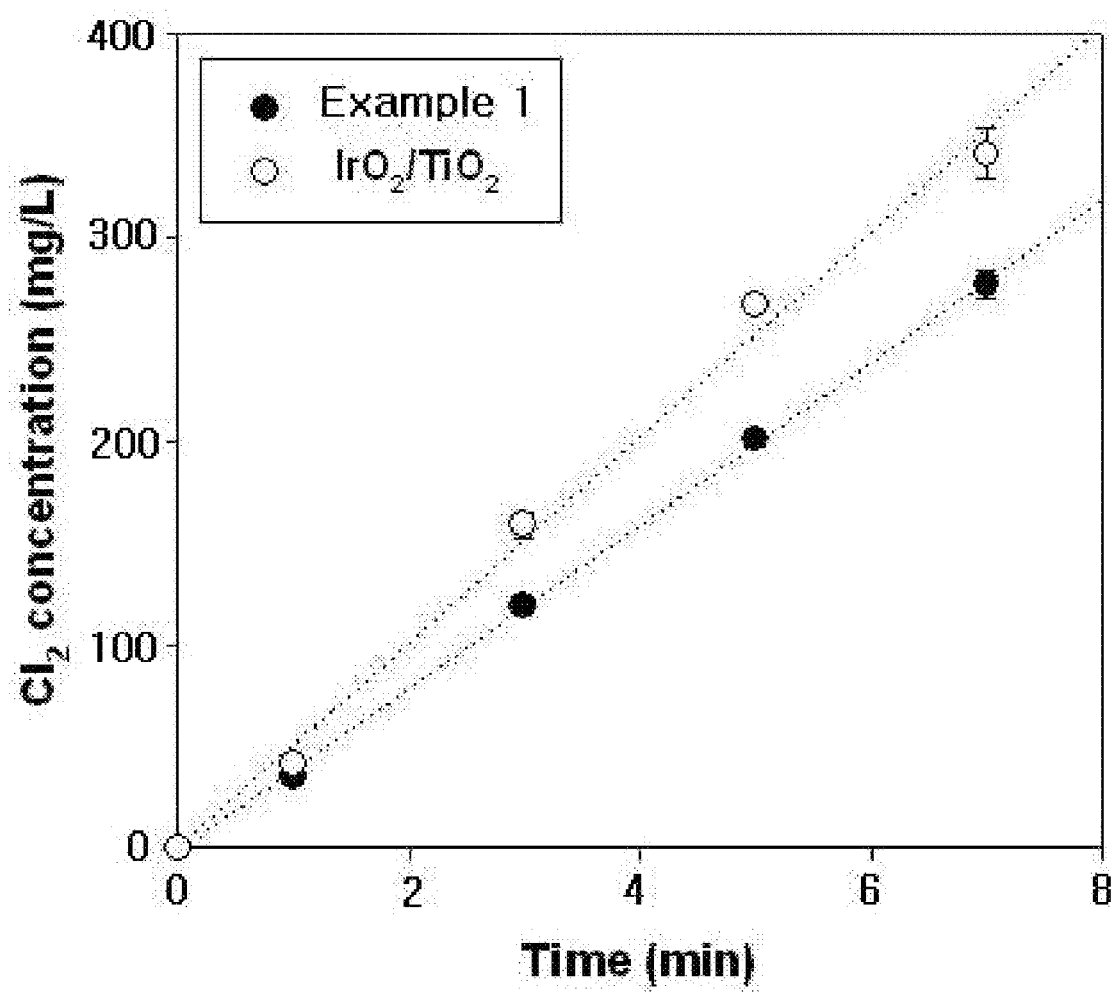
FIG. 8 is a graph illustrating chlorine production properties of the titanium oxide electrode according to Example 1 and the conventional $IrO_2/TiO_2$ insoluble electrode (dimensional stable electrode, DSA).

Referring to FIG. 8, it can be noted that the titanium oxide electrode of Example 1 has no big difference with compared to the $IrO_2/TiO_2$ insoluble electrode, which is known for having superior chlorine production properties.

The present invention may be used for an active oxygen species production system for water treatment and/or disinfection, a chlorine production system, a dye-sensitive solar cell, an electric double-layer capacitor or the like.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present inventive concept.

What is claimed is:

1. A method for manufacturing a titanium oxide electrode, the method comprising:
   preparing a titanium oxide base material;
   annealing the titanium oxide base material at 300° C. to 500° C.; and
   performing electrolysis in an electrolyte solution including hydroxyl alkali and $KH_2PO_4$ with using the titanium oxide base material as a cathode to electrically reduce the titanium oxide base material.

2. The method of claim 1, wherein preparing the titanium oxide base material comprises:
   anodizing titanium to form a titanium oxide layer; and
   forming a nano-tube array from the titanium oxide layer.

3. The method of claim 2, wherein forming the nano-tube array from the titanium oxide layer comprises performing electrolysis in an electrolyte solution including a fluorine compound.

4. The method of claim 1, wherein an anode used in the electrolysis includes platinum, iron, nickel or carbon.

5. An active oxygen species production system comprising:
   a container;
   an electrolyte solution disposed in the container;
   a cathode dipped in the electrolyte solution; and
   a titanium oxide anode dipped in the electrolyte solution and manufactured by the method of claim 1.

6. The active oxygen species production system of claim 5, further comprises a separator disposed between the cathode and the anode.

7. A dye-sensitized solar cell comprising a titanium oxide electrode manufactured by the method of claim 1.

8. An electrical double-layer capacitor comprising a titanium oxide electrode manufactured by the method of claim 1.

9. A chlorine production system comprising:
   a container;
   an electrolyte solution disposed in the container and including chlorine;
   a cathode dipped in the electrolyte solution; and
   a titanium oxide anode dipped in the electrolyte solution and manufactured by the method of claim 1.

* * * * *